United States Patent [19]

Guilbaud

[11] Patent Number: 4,959,259

[45] Date of Patent: Sep. 25, 1990

[54] METHOD FOR THE PROTECTION AGAINST WATER OF A LAMINATED RESIN WALL, AND A PROTECTED LAMINATED RESIN WALL THUS OBTAINED

[75] Inventor: Vincent Guilbaud, Chauve, France

[73] Assignee: Chantiers Beneteau S.A., Saint Hilaire De Riez, France

[21] Appl. No.: 259,147

[22] Filed: Oct. 18, 1988

[30] Foreign Application Priority Data

Aug. 24, 1988 [FR] France .................................. 88 11180

[51] Int. Cl.$^5$ .......................... B32B 7/02; B32B 27/08
[52] U.S. Cl. ..................................... 428/215; 156/245; 427/385.5; 427/412.5; 428/480; 428/907

[58] Field of Search .................... 106/14.13, 14.35, 17; 428/480, 482, 483, 907, 215; 427/384, 412.5, 389.8, 385.5; 156/245

[56] References Cited

U.S. PATENT DOCUMENTS 4,126,719 11/1978 Koyanagi et al. .................. 156/245
4,724,173 2/1988 Rockett et al. .................. 427/389.8

*Primary Examiner*—Thomas J. Herbert
*Attorney, Agent, or Firm*—Young & Thompson

[57] ABSTRACT

The invention relates to a laminate based structure, such as a boat hull or a swimming pool, in which the laminate is coated with a barrier-layer or skin coat, in turn coated with a gel layer or gel coat, in which said barrier-layer or skin coat is made of a bisphenol based resin.

13 Claims, No Drawings

METHOD FOR THE PROTECTION AGAINST WATER OF A LAMINATED RESIN WALL, AND A PROTECTED LAMINATED RESIN WALL THUS OBTAINED

FIELD OF THE INVENTION

The present invention relates to laminated resin walls suitable for use is a structure which is in contact with water for prolonged periods, such as boat hulls, swimming pool walls, basins and containers, etc.

BACKGROUND OF THE INVENTION

Laminated resin interior are obtained by applying on the wall of a mold having the required shape mechanically resistance fibers coated with a resin. The result would be a wall in contact with the mold having surface irregularities and the mechanically resistant wall obtained would include pores, which would favour the penetration of water within the thickness of the wall, thereby degrading the constituent resins.

In order to provide a good appearance to the surface of laminated castings, it is known first to coat the surface of the mold with a film forming resin, technically called gel coat. The film forming resins used are polyesters, epoxy resins, etc., which provide semi-permeable membranes. The result is that when they are applied on laminated resin walls that remain in contact with water, such as swimming pool walls and boat hulls, the outer layers of the gel coat allow the water to penetrate rather quickly into the laminated resin, thereby causing partial separations of the resin layer of the gel coat and the formation of bubbles or blisters. This phenomenon, known as "blistering", lets the water flow to the laminate which is subjected to hydrolysis, so that in addition to the unaesthetic appearance of the blisters, the mechanical characteristics of the laminate are reduced.

In an effort to remedy this disadvantage, it has been proposed to interpose between the laminate and the superficial resin layer or gel coat a layer of resin forming a barrier against the water, called "skin coat". Such a use of two superimposed layers in a laminate limits the choice of the barrier-layer resin, which has to be compatible in order to avoid in particular a risk of separtion between the successive layers, particularly under the effect of impacts, as is the case with an intermediate layer of epoxy resin.

So, it has been proposed to provide such a barrier-layer of a vinylester based resin. The use of vinylester based resins, which has been known for a long time in the polyester industry for increasing corrosion resistance, provides a certain increase of the resistance to the penetration of water, while maintaining or even increasing the mechanical strength of the laminate thus coated.

However, it has been recognized that the vinylester based barrier-layer exhibits a certain degree of sensitivity to water and does not delay in a satisfactory way the hydrolysis of the resin of the laminate.

Due to the known high anti-corrosion characteristics of the vinylester resins, the inventor has been led to think that the part played by the barrier against the penetration of water was not tied to the anticorrosive properties of the resin constituting the layer, but resulted from a purely mechanical effect. The vinylester resins which have reactive sites only at the end of their chain, provide in fact a network with a small steric space requirement, thereby facilitating the passage of water through them.

On the basis of this theory, the inventor has studied the behaviour as barrier-layer between the gel coat and the laminate of resins having a high steric space requirement, and he has established that a high steric space requirement would greatly reduce the layer permeability.

OBJECTS AND SUMMARY OF THE INVENTION

Consequently, the object of the invention is a protection method against water, particularly sea water, of a laminated resin substrate coated on its face in contact with the water with a layer of film-forming resin called "gel coat", comprising interposing between the laminated resin substrate and the gel coat layer a barrier-layer, wherein the barrier-layer is constituted by a resin having in its chain cyclic nuclei and double reactive bonds imparting to the resin a high steric space requirement.

The typical resins usable within the scope of the invention are resins having a higher steric space requirement than the gel coat resin, such as unsaturated bisphenolic polyesters, the bisphenolic polyesters hydrogen and unsaturated (the bisphenol nucleus of which is saturated) and the unsaturated isophtholic polyesters.

The bisphenolic resins are known for their properties of protection as regards chemical aggressions, but have never been envisioned for forming a barrier against water between a laminated resin and a gel coat layer, such a barrier effect being essentially physico-chemical.

As an example of a bisphenol based resin which can be used preferably for forming the barrier according to the invention, one may cite a bisphenolic polyester resin solid under the trade-mark "STRATYL 1110" and having the following molar formulation:

Bisphenol A: 0.2 mole
Propylene glycol: 0.8 mole
Maleic anhydride: 0.6 mole
Phtalic anhydride: 0.4 mole in dilution in a reactive comonomer such as as styrene.

In order to ensure an excellent cohesion between the layers, the invention provides that the gel coat layer is applied on the interior of a mold and the bisphenol based resin layer is applied on the gel coat layer after gelation of the resin, but prior to complete polymerization, that is between 1 hour 30 min and 4 hours after application of the resin layer forming the gel coat. By applying the barrier-layer on the gel layer which is not yet fully polymerized, one ensures a stable bond between the two layers.

Likewise, in order to provide a good cohesion between the barrier-layer and the laminate, the invention provides that the lamination is carried out in a very short time after the deposition of the barrier-layer and prior to the complete polymerization of the barrier-layer.

Advantageously, the barrier-layer and the gel coat layer each have a thickness between 0.30 and 0.45 mm. There is thus provided a good preservation of the mechanical properties of the assembly, with limited weight and costs.

The invention also relates to a structure including laminated resin walls, such as boat hulls, swimming pools, etc., the walls being obtained by the above method.

DETAILED DESCRIPTION OF THE INVENTION

The practicing of the invention will be described in more detail hereafter.

A barrier-layer according to the invention has been used for making the hull of a boat having a length of 13 meters, with a total outer surface of 53 m² composed of 36 m² of underwater parts wetted by the water and 17 m² of upper parts.

On the inner wall of the mold has been applied with a gun a propylene-diethylene-neopentyl glycol maleoisophthalate based resin, with styrene as a reactive monomer. This resin used for forming the gel coat has been applied with a thickness of 0.9 mm on the surface corresponding to the upper parts, viz. 19 kg, and of 0.41 mm on that corresponding to the underwater parts, viz. 18.5 kg. The gelation of this gel coat has been provided by 2% of methylethytone peroxyde in a 50% solution in phthalate.

Three hours after application of this gel coat layer which is then polymerized and dry, there has been applied with a gun on the surface corresponding to the underwater parts and with a thickness of 0.46 mm, 18 kg of a malephthalate of bisphenol A hydrogen and propylene, with styrene as reactive monomer. This resin is sold under the trademark of "STRATYL 1110".

The gelation of this layer has been provided with 2% of a 50% methylethylketone peroxide solution in phthalate. A barrier-layer, called "skin coat" has thus been provided on the underwater parts.

After polymerization for 4 hours of this skin coat layer, there was formed on its inner face and on the inner face of the gel coat of the surface corresponding to the upper parts, the polyester based laminated resin wall, reinforced with glass fibers. The hull thus made has proved to be practically impermeable and did not exhibit blisters after several months use in water.

COMPARISON TEST BETWEEN TWO SKIN COATS, ONE VINYLESTER BASED AND THE OTHER ACCORDING TO THE PRESENT INVENTION

In order to assess the performance of a gel coat based on maleoisophthalate of propylene-diethylene-neopentyl glycol associated with vinylester resin or bisphenolic polyester based skin coat layer, the following tests have been carried out.

1. Sensitivity to water of the skin coat consituting resins

This test has been carried out on plaquettes having a diameter of 8 cm, weight of about 25 g and a thickness of 5 mm. Two plaquettes have been made, one comprising the bisphenolic polyester resin sold under the trademark of "STRATYL 1110", the other comprising a vinylester resin sold under the trademark "ATLAC 580".

The two plaquettes were immersed in water until stabilization of the weight due to the water intake occurred.

The plaquettes were thereafter dried and weighted so as to measure the losses through solubilization of the endogenic compounds under the effect of the hydrolysis of the product and of the exogenic compounds.

The results are shown in Table No. 1.

TABLE No 1

|  | water intake | losses through solubilization |
|---|---|---|
| Plaquette comprising vinylester resin "ATLAC 580" | 0.7 | 0.35 |
| Plaquette comprising bisphenolic polyester resin "STRATYL 1110" | 0,26 | 0,14 |

2. Accelerated aging when in contact with water

The object of this second series of tests was to compare the aging of a laminated resin protected by an isophthalic gel coat and by an isophthalic gel coat associated with a skin coat based on "ATLAC" vinylester resin and a skin coat based on "STRATYL" bisphenolic resin. The aging was assesed by the occurence of blisters on the surface, after immersion in water at 60° C.

The results are shown in Table No. 2.

TABLE No 2

| Skin coat | Results |
|---|---|
| No skin coat | Occurrence of bubbles after 230 hours |
| ATLAC based skin coat | Occurrence of bubbles after 910 hours |
| STRATYL based skin coat | No bubbles after 1600 hours; test stopped |

The bisphenolic based skin coat according to the invention thus notably improves the protection against the penetration of water and hydrolysis.

I claim:

1. A structure for prolonged contact with water, comprising a laminated resin wall having an outermost gel coat resin layer, an underlying substrate, and between said gel coat layer and said substrate, a barrier layer consisting essentially of a polymerized resin formed from components having cyclic nuclei and reactive double bonds, said resin having a high steric space requirement relative to vinyl-ester resin and a higher steric space requirement than said gel coat resin layer.

2. A structure for prolonged contact with water, comprising a laminated resin wall having an outermost gel coat resin layer and an underlying substrate, and between said outermost gel coat resin layer and said underlying substrate, a barrier layer consisting essentially of a resin selected from the group consisting of bisphenolic polyesters and unsaturated isophthalic polyesters, said barrier resin having a higher steric space requirement than said gel coat resin layer.

3. The structure according to claim 2, wherein said barrier layer comprises a bisphenolic polyester resin having the following molar formulation:
   Bisphenol A: 0.2 mole
   Propylene glycol: 0.8 mole
   Maleic anhydride: 0.6 mole
   Phthalic anhydride: 0.4 mole.

4. The structure according to claim 2, wherein said bisphenolic polyester is at least partially unsaturated.

5. The structure according to claim 4, wherein said bisphenolic polyester is a polyester in which the bisphenolic nucleus is saturated.

6. A structure for prolonged contact with water, comprising a laminated resin wall formed from a substrate whose outer surface is placed in contact with water, said outer surface having coated thereon a barrier layer of polymerized resin consisting essentially of at least one member selected from the group consisting of bisphenolic polyesters and unsaturated isophthalic polyesters, said layer having a thickness of 0.30 to 0.45 mm, and a gel coat resin layer coating said barrier resin layer, said gel coat resin layer having a thickness of 0.30 to 0.45 mm and a lower steric space requirement than said barrier resin.

7. The structure according to claim 6, wherein said polymerized resin is an at least partially unsaturated bisphenolic polyester.

8. The structure according to claim 7, wherein said bisphenolic polyester is a resin in which the bisphenol nucleus is saturated.

9. A method for protecting against water a composite resin substrate having an outermost coating of a gel coat resin layer, comprising interposing between the composite resin substrate and the gel coat resin layer a barrier layer consisting essentially of a resin having cyclic nuclei and reactive double bonds, said resin having a high steric space requirement relative to vinylester resin and a higher steric space requirement than said gel coat resin layer.

10. A method for protecting against water a composite resin substrate having an outermost gel coat resin layer, comprising interposing between the composite resin substrate and the outermost gel coat resin layer a barrier layer consisting essentially of a resin selected from the group consisting of bisphenolic polyesters and unsaturated isophthalic polyesters, said barrier resin having a higher steric space requirement than said gel coat resin layer.

11. The method according to claim 10, wherein said barrier layer comprises a bisphenolic polyester resin having the following molar formulation:

Bisphenol A: 0.2 mole
Propylene glycol: 0.8 mole
Maleic anhydride: 0.6 mole
Phthalic anhydride: 0.4 mole.

12. The method according to claim 10, wherein said bisphenolic polyester resin is at least partially unsaturated.

13. The method according to claim 12, wherein said bisphenolic polyester resin is a resin in which the bisphenolic nucleus is saturated.

* * * * *